March 29, 1960  K. FILLMANN ET AL  2,930,427
DEVICE FOR SPLICING ENDS OF WEBS BY MEANS
OF A PLURALITY OF LONGITUDINAL TAPES
Filed April 12, 1955  3 Sheets-Sheet 1
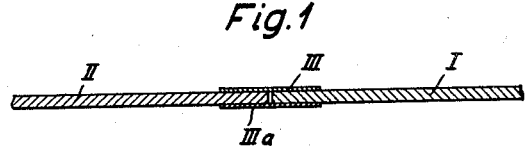
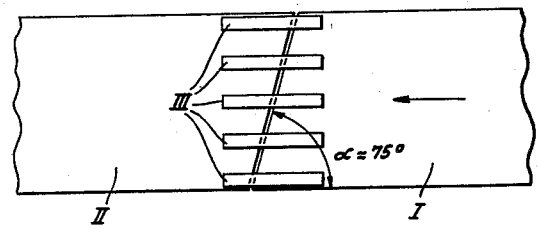
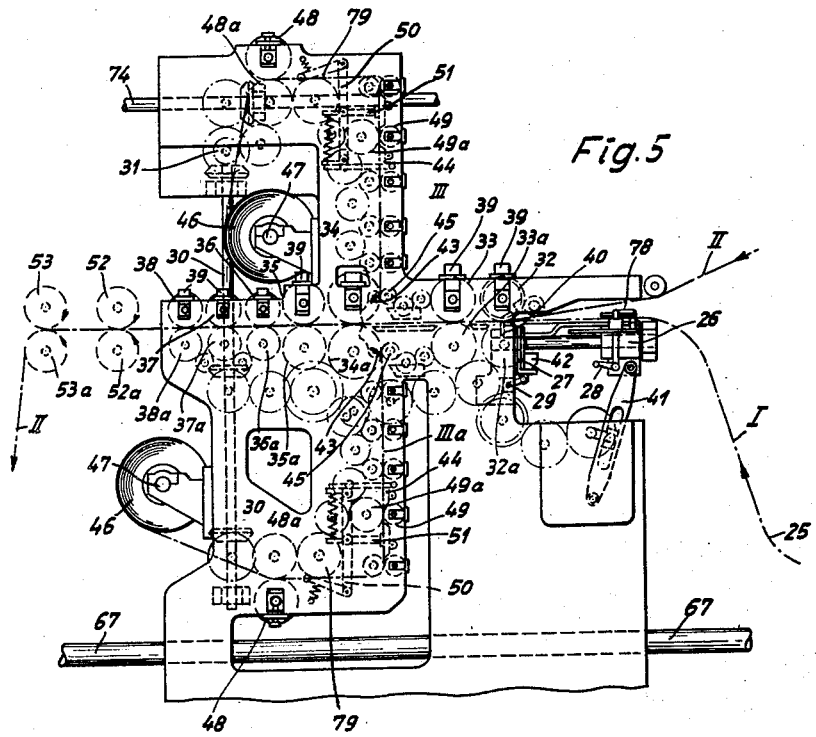
INVENTORS:
KARL FILLMANN
HERMANN STEPHAN March 29, 1960 K. FILLMANN ET AL 2,930,427
DEVICE FOR SPLICING ENDS OF WEBS BY MEANS
OF A PLURALITY OF LONGITUDINAL TAPES
Filed April 12, 1955 3 Sheets-Sheet 2

INVENTORS:
KARL FILLMAN
HERMANN STEPHAN
Richardson, David and Nordon
ATTYS

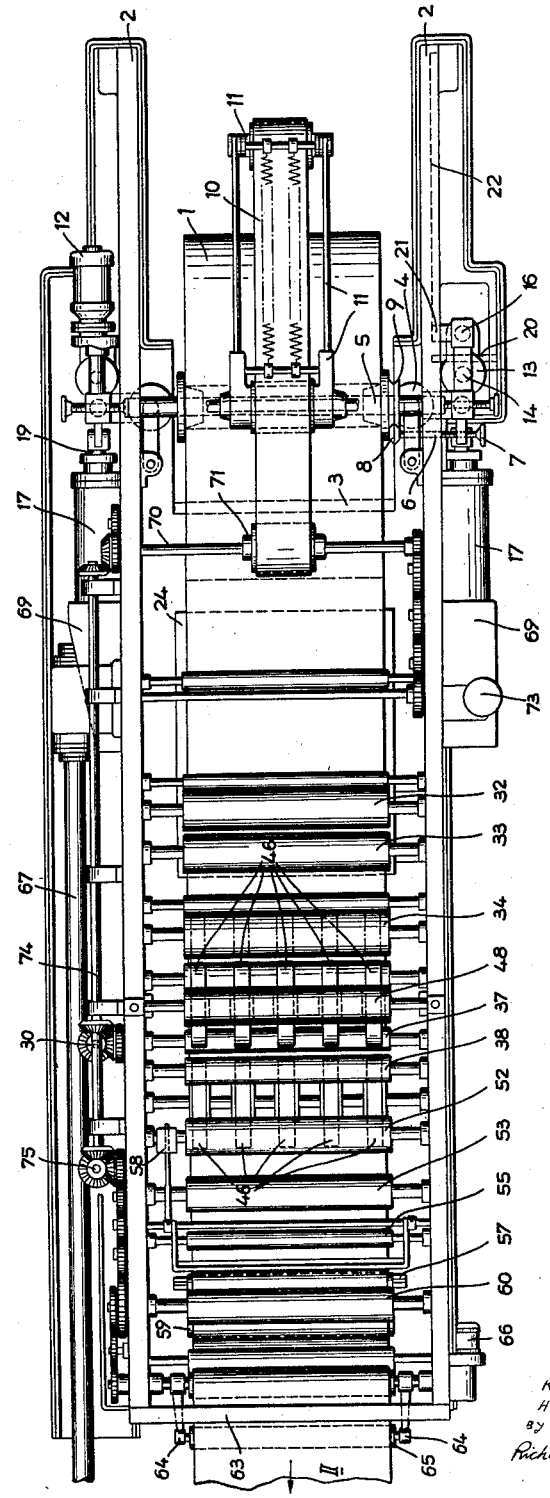

United States Patent Office 2,930,427
Patented Mar. 29, 1960

2,930,427

DEVICE FOR SPLICING ENDS OF WEBS BY MEANS OF A PLURALITY OF LONGITUDINAL TAPES

Karl Fillmann and Hermann Stephan, Stuttgart-Bad Cannstatt, Germany, assignors to Firma Fr. Hesser, Maschinenfabrik-Aktiengesellschaft, Stuttgart-Bad Cannstatt, Germany, a corporation of Germany Application April 12, 1955, Serial No. 500,954

Claims priority, application Germany April 17, 1954

7 Claims. (Cl. 154—42.3)

This invention relates to a method and device for continuously feeding a web of cardboard, paper or similar material from supply rolls and in particular for continuously feeding a cardboard web in the operation of cardbox working machines, such as rotary printing machines. In machines of this kind the cardboard web is supplied in form of rolls which have to be unrolled uniformly and substantially at the speed of operation of a machine with which it is to be used, such as a printing machine. In order to assure continued operation of the machine without interruption during changing of rolls, i.e. when a completely unrolled roll has to be replaced by a new one, the running off web is connected with the leading end of the new roll thus providing an uninterrupted web.

When working with paper webs it is usual to join the ends of webs simply by sticking the leading end of the new web to the running off web. There are also known various devices effecting this joining operation with the machine running, the paper rolls being mounted in this case on spider or star type wheels to which an angular movement is imparted for each roll changing operation.

This known method of joining two webs, however, cannot be applied when working with cardboard webs of more or less considerable thickness since sticking the web ends in overlapping relation would increase too much the thickness of the web at the junction so that it could not be drawn through, for instance, between closely approached printing cylinders of a rotary printing machine. Taking into account this circumstance it has become common practice to place manually the trailing end of the run off cardboard web in abutting relation with the leading end of the new web with the machine being at a standstill and to join the ends by means of a gummed tape. It is obvious that this manner of joining the ends of cardboard webs is comparatively time consuming and implies the disadvantage that the machine has to be stopped for changing of rolls.

A further disadvantage results from the use of the usual spider or star type wheels which not only are very bulky but also require considerable forces for pivoting the heavy rolls.

The primary object of the invention is to eliminate these drawbacks and to provide a cardboard feeding device for continuously feeding a cardboard web to a cardbox working machine at a speed which is strictly in conformity with the speed of operation of this machine without it being necessary to stop it when the rolls have to be changed.

For this purpose the feeding device according to the invention is provided with a novel hydraulically operable roll raising and pivoting unit capable of raising the cardboard rolls and moving them out of the path of the cardboard web after having been unrolled. The feeding device is further provided with a sticking unit the functions of which are to cause the running off web to be cut off obliquely during the operation of the machine, to advance the leading end of the new roll likewise obliquely cut off towards the end of the running off web and to join the ends of both webs by means of a plurality of gummed tapes extending in the longitudinal direction of the web. The oblique cut is particularly advantageous with rotary printing machines since when the two web ends are not in closely abutting relation no lowering of the printing cylinders and consequently no misalignment of the register will occur.

In order to permit controlling of the feeding speed of the cardboard web and to tune this speed to the speed of operation of the printing or other machine, according to a further feature of the invention a loop is formed in the cardboard web at the exit end of the feeding device by means of a movably arranged cylinder, the length of this loop being picked up by means of electron-optical scanning device comprising two photocells or the like. This scanning device controls in a manner known as such by means of a control gear unit the advancing speed of the cardboard web.

One embodiment of the invention as applied to a rotary printing machine is shown by way of example in the accompanying drawings, in which:

Figs. 1 and 2 show the manner in which two cardboard web ends are joined;

Fig. 4 is a plan view of the same device and

Fig. 5 shows in an enlarged scale the sticking unit of the feeding device.

Figure 3:
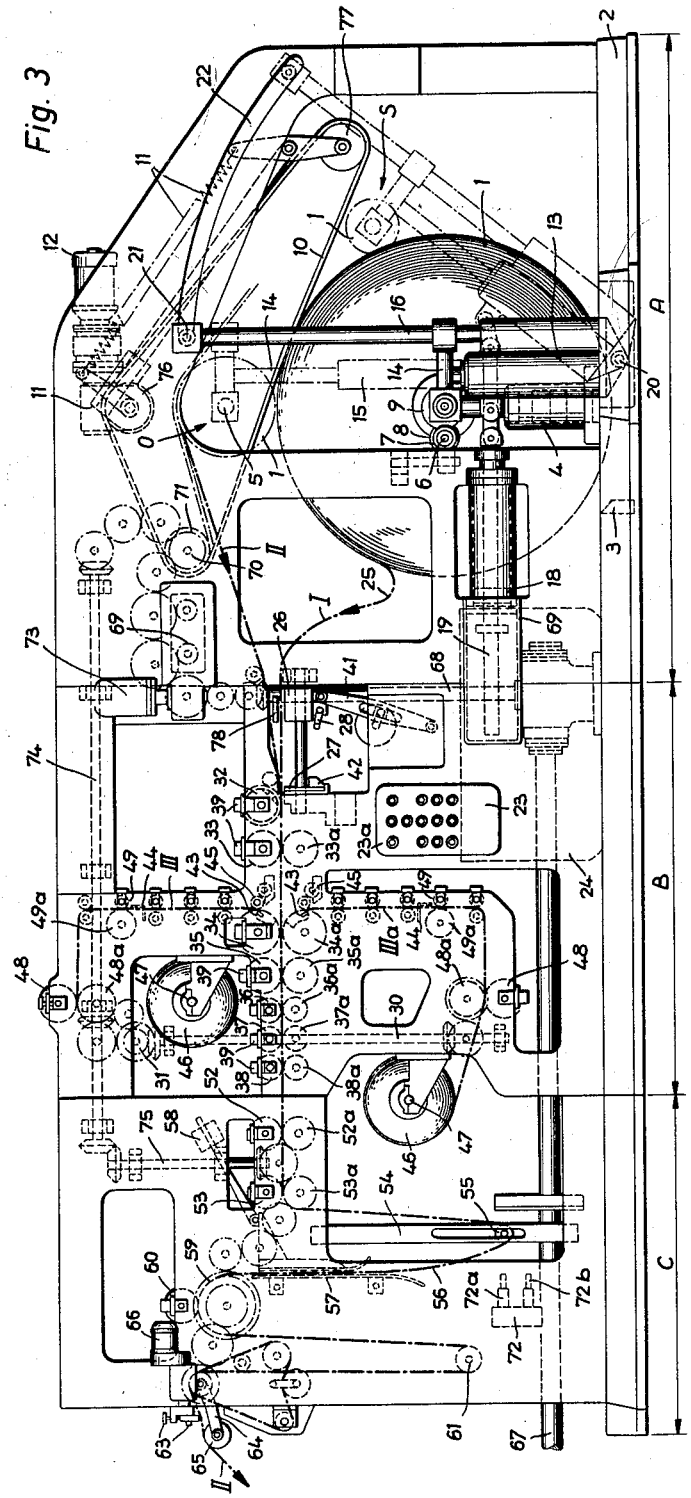
Fig. 3 is a longitudinal view of the entire feeding device.

As shown in Figs. 3 and 4, the cardboard web feeding device of the present invention comprises a roll raising and changing unit A, an automatic sticking unit B, and a control and braking unit C.

*Roll raising and changing unit A*

When putting the machine into operation a cardboard roll 1 is rolled between a correspondingly recessed machine base plate 2 and urged against an abutment 4 capable of being adjusted to different roll diameters and hydraulically, or if desired, mechanically lifted off the bottom by means of a lifting unit 4, shown in Fig. 3, which is mounted on the left-hand and right-hand side of the base plate and engages a shaft 5. First, the cardboard web II is inserted manually into the rotary printing machine by passing it over corresponding guide, deflection and conveying cylinders in the sections B and C of the feeding device. Exact lateral adjustment is effected by turning a spindle 6 by means of a hand wheel 7 and a key type disc 8 which latter is in mesh with a counter disc 9 rigidly secured to the shaft 5. Now an endless belt 10 is placed on the cardboard roll 1 by lowering a webbing carrier 11 by means of a positioning motor 12. The belt 10 runs about pulleys 71, 76 and 77 of which the two latter are mounted on the belt carrier 11. The pulley 71 is secured to the drive shaft 70 of a control gear unit 69 thus acting as a drive pulley for the belt.

After these preliminary operations have been effected the device can be put into action and the cardboard web drawn off the roll 1. If by drawing off the web from the cardboard roll 1 the diameter of the latter has been reduced by approximately two thirds of its original diameter it will be moved upwards together with the shaft 5 into the position O without interrupting the web motion by means of hydraulic raising units 13 arranged at the left and at the right of the roll 1. At the same time the belt 10 will be so displaced by the positioning motor 12 that the contact between the running off roll 1 and the belt 10 is not interrupted. Each of the raising units 13 comprises a pressure piston 14 and two or three telescopically movable pressure cylinders 15 actuated by pressure oil and additionally guided by posts 16. The raising units 13 are likewise hydraulically operable and pivotally mounted about joints 20. For this purpose horizontally arranged cylinders 17 are provided the pistons 18 of which are pivotally connected by means of piston rods 19 with the lowest pressure oil actuated cylinders of the raising units 13. In their pivoting motion the raising units 13 are guided by means of antifriction bearings 21 attached to the guide posts 16 and capable of rolling in arcuate guide slots 22 of the machine frame 2. The lifting unit 4 and the raising units 13 as well as the pressure oil operated cylinders 17 of the pivoting unit are controlled by means of an electro-hydraulical control unit 23 of known type secured to the machine frame and preferably operable from a movably supported control desk 23b or from a control panel 23a. The pressure oil is supplied by a suitable pressure pump and withdrawn from a container 24.

If the running off cardboard roll 1 is in its upper position O a new cardboard roll 1 can be inserted and lifted from the bottom by means of the lifting unit 4. The leading end of the cardboard web I is cut off obliquely, as shown in Fig. 1, and after forming a loop 25 inserted into the cardboard follow-up carriage 26 of the sticking unit B and moved until abutting against a stop member 27 whereupon it is clamped to the cardboard follow-up carriage 26, as shown in Fig. 5, by pressing down a lever 28 actuating a clamping jaw 78. Now the stop member 27 is lowered so that the leading end of the new web I is exposed.

In order to avoid that in case the lowering of the stop member 27 is omitted which might cause the stop member 27 to be seized and damaged by the cross cutter 32 upon advancing the cardboard follow-up carriage 26, a safety contact 29 is provided which prevents cutting-in of the sticking unit B until the stop member 27 has been lowered.

Now the preliminary operations for sticking the leading end of the web I of the new cardboard roll 1 to the trailing end of the web II of the running off roll 1 which latter web in the meantime has been further drawn off are now completed. When the old roll 1 is almost completely unrolled, it is pivoted by means of the pivoting unit 17, 18 and 19 described about the points 20 and brought into the position O indicated with dashed lines in Fig. 3. At the same time the belt 10 is correspondingly displaced by means of the positioning motor 12. In this way the cardboard web II has been positioned exactly above the web I so that the automatic sticking operation is initiated.

Sticking unit B

First, the speed of the rotary printing machine is reduced i.e. diminished to the drawing-in speed. The sticking together of the webs I and II by means of the sticking unit B is controlled by means of a control shaft 30 making one complete revolution during each complete sticking operation. For this purpose a single revolution clutch 31 is provided which in a manner known as such is automatically disengaged after one complete revolution and engaged by means of a push button. Simultaneously with the engagement of the clutch 31 the cross cutting cylinders 32, the front drawing cylinders 33/33a, the gripper cylinders 34/34a, the rear drawing cylinders 35/35a and the pressing cylinders 36/36a, 37/37a and 38/38a, which in their position of rest i.e. before and after the changing of rolls are in a raised position, are brought into engagement with each other by hydraulic or electromagnetic units 39 of known type. The cross cutting cylinder 32 and the counterknife 40 are cutting the cardboard web II obliquely i.e. with a certain angle, preferably 75° (Fig. 2). At the same time the cardboard follow-up carriage 26 in which the cardboard web I is clamped is advanced by means of a crank arm 41. This results in the cardboard web I being caused to follow very quickly the trailing end of web II and fed to the drawing cylinders 33/33a in such a manner that there will be no remarkable clearance between the webs I and II. Once the cardboard web I being seized by the drawing cylinders 33/33a the web I is automatically released due to the lever 28 engaging the abutment 42 which causes the clamping jaw 28 to be lifted from the carriage 26. The remainder of the web II is quickly removed manually or, if desired, by means of an electric motor mounted in the head of the pressure piston 14 so as to rotate the roll 1 backwards and the belt 10 then immediately brought in engagement with the new roll 1, so that the latter is set in motion. In order to have sufficient time for this cycle of operation the loop 25 in the web I is provided. Immediately after the single revolution clutch 31 having been engaged the grippers 43 on the gripper cylinders 34/34a will seize the gummed tapes III and IIIa, which are cut into suitable lengths by knives 44 and drawn past the dampening devices 45 and then stuck from above and below to the ends of the webs II and I (Fig. 1) with the drawing cylinders 33/33a and 35/35a continuing to move the webs without, however, applying a tension on them. Further pairs of cylinders 36/36a, 37/37a and 38/38a press the gummed tapes III and IIIa to both faces of the cardboard webs thereby assuring an unobjectionable connection. The gummed tapes III and IIIa are drawn off from supply rolls 46 of which depending on the width of the cardboard three to five may be provided on the axles 47 by the drawing cylinders 48/48a and 49/49a and, as already mentioned, cut off by the knives 44 which are moved by means of a cam 79 through a linkage 50, the linkage 50 operating at the same time also the holding part or member 51 connected thereto.

After one revolution of the control shaft 30 the sticking operation is completed, the clutch 31 automatically disengaged and the cylinder pairs 32 to 38 simultaneously lifted again from the web in which position they remain until the next sticking operation. Thereupon the speed of the machine is again increased to its normal operating speed. The shaft 5 of the unrolled cardboard roll is removed and the raising units 13 moved into their initial position and pivoted back below the shaft 5 of the new roll 1. The same cycle of operation is repeated for the next sticking process.

Control and brake unit C

In operation the cardboard web is drawn off the roll 1 by the continuously running drawing cylinder pairs 52/52a and 53/53a from which latter it is passed around a roll 55 which is guided for a free up and down motion within the guide member 54 (Fig. 3) thereby forming a loop 56 designated in the following as a control loop. The braking and tensioning of the cardboard web is effected on the one hand by means of a plate type brake 57 the braking action of which may be adjusted in a known manner by means of a weight 58, and on the other hand by means of a brake cylinder 59 which too is driven in known manner with a corresponding lag and the braking action of which is adjustable by means of a pressing cylinder 60. Passing the deflection shaft 61, the brushing unit 62 and the cardboard breaker 63 which is capable of being cut in or out by raising or lowering the cylinder 65 mounted in the arms 64 by means of the positioning motor 66, the cardboard web is fed towards the rotary printing machine.

The drive of the various units of the feeding device is effected from the main drive shaft 67 (Fig. 3) driving by means of the vertical intermediate shaft 68 the infinitely variable gearing 69 from which again through the shaft 70, the belt 10 and through the shafts 74 and 75 the drawing cylinders 62 and 53 are driven. From the shaft 74 also the sticking unit B is driven during the sticking operation. The speed of the shafts 70, 74 and 75 which are driven through the gear unit 69 is controlled by means of the cardboard web control loop 56, already described, the length of which is picked up by means of an electron-optical unit 72 which may comprise two photocells 72a and 72b. These photocells 72a, 72b are connected through suitable relays to the positioning motor 73 of the gear unit 69 which positioning motor depending on the control loop becoming longer or shorter causes the speed of the drive shaft of the gear unit 69 to be retarded or accelerated thereby correspondingly controlling the drawing speed of the feeding device.

This manner of controlling of the drawing speed as well as of the novel unit described for raising and pivoting the cardboard roll may, of course, also be applied to feeding devices for paper webs. The sticking of a new paper roll to the running off web could be effected in this case in the manner already known and mentioned in the introductory part of this specification.

The feeding device of the present invention is further so designed that the automatic sticking unit may be omitted without alteration of the remaining machine parts of the device in cases where, e.g. with machines of reduced power, the use of such sticking units would not justify the cost.

Though in the present embodiment the roll raising and pivoting unit is actuated by push button control it may also be automatically controlled e.g. by picking up the running off cardboard roll 1 by means of electrical, electron-optical or mechanical scanning or feeler devices of known type in its diameter and position and actuating the raising and pivoting unit by means of corresponding relays.

What is claimed is:

1. A machine for splicing ends of cardboard webs while continuously being fed through a cardboard working machine, including means for obliquely cutting off the trailing edge of the running-off web including a cross cutting cylinder, means for detachably clamping the likewise obliquely cut leading end of a new web, including a follow-up carriage causing the leading edge and the running-off edge to abut one another, drawing cylinders simultaneously seizing the new web, when released from said clamping means, said cylinders being arranged posteriorly to said cross cutting cylinder, and means for splicing said abutting web edges together.

2. A machine according to claim 1, in which the splicing means include a plurality of gummed tapes, means for applying to both the webs at the place where the running-off web and the new web are abutting each other, said plurality of gummed tapes extending in spaced parallel relationship and in the longitudinal direction of the web over the junction, and a plurality of cylinders for pressing and sticking together said tapes to the web in the course of the further advancing motion thereof.

3. A machine according to claim 2, including a plurality of separate supply rolls, one for each gummed tape, gripper rollers for drawing off each tape, knives for cutting said tapes into suitable lengths, a plurality of gripper cylinders positioned at the respective sides of the web passing therebetween, and means for dampening and rolling said tapes onto the web.

4. A machine for splicing ends of cardboard webs while continuously being fed through a cardboard working machine, including means for obliquely cutting off the trailing edge of the running-off web including a cross cutting cylinder, means for detachably clamping the likewise obliquely cut leading end of a new web, including a follow-up carriage causing the leading edge and the running-off edge to abut one another, drawing cylinders simultaneously seizing the new web when released from said clamping means, said cylinders being arranged posteriorly to said cross cutting cylinder, and means for splicing said abutting web edges together, said machine also including a crank arm for operating said follow-up carriage, suitable guide means within which said carriage is slidable longitudinally of the web, a clamping jaw on said carriage, a lever for operating said jaw so as to clamp and to advance the new web, and a shiftable stop member provided on the front portion of said follow-up carriage against which the new web is advanced.

5. A machine according to claim 4, also including an abutment engaging said lever during the advancement of said carriage, so as to release said web from said jaw.

6. A machine for splicing ends of cardboard webs while continuously being fed through a cardboard working machine, including means for obliquely cutting off the trailing edge of the running-off web including a cross cutting cylinder, means for detachably clamping the leading end of a new web and causing said leading end to abut the obliquely cut trailing end of said running-off web, drawing cylinders simultaneously seizing the new web when released from said clamping means, said cylinders being arranged posteriorly to said cross cutting cylinder, and means for splicing said abutting web edges together, said machine also including a control shaft for the entire splicing unit, means for driving said control shaft from the same power source as said drawing cylinders, a clutch of the type automatically disengaging itself after a single revolution, and a push button for predeterminedly engaging said clutch, whereby the sticking operation is effected during a single revolution of the control shaft.

7. A machine according to claim 6, further including means operative simultaneously with the engagement of the clutch of said control shaft for bringing said cutting cylinder, said clamping means and said drawing cylinders simultaneously into operative engagement with said webs and for retracting said cylinders and said clamping means simultaneously from said engagement upon disengagement of said clutch.

References Cited in the file of this patent

UNITED STATES PATENTS

| | | |
|---|---|---|
| 1,949,238 | Broadmeyer | Feb. 27, 1934 |
| 2,435,376 | Wilcoxon | Feb. 3, 1948 |
| 2,606,136 | Garrett et al. | Aug. 5, 1952 |
| 2,622,816 | Koch | Dec. 23, 1952 |
| 2,706,515 | Evers | Apr. 19, 1955 |
| 2,745,464 | Auerbacher et al. | May 15, 1956 |